Jan. 21, 1964 J. C. SMELTZER ETAL 3,119,031

SHIFT REGISTER WITH INPUT MEMORY CONVERTING LOGIC LEVEL SIGNALS TO POSITIVE OR NEGATIVE CLOCK PULSES

Filed Jan. 29, 1962

JACK C. SMELTZER
ELLIOTT E. RECH
INVENTORS

BY Arthur Freilich

AGENT

United States Patent Office 3,119,031
Patented Jan. 21, 1964

3,119,031

SHIFT REGISTER WITH INPUT MEMORY CONVERTING LOGIC LEVEL SIGNALS TO POSITIVE OR NEGATIVE CLOCK PULSES

Jack C. Smeltzer, Woodland Hills, and Elliott E. Rech, Canoga Park, Calif., assignors to Thompson Ramo Wooldridge Inc., Canoga Park, Calif., a corporation of Ohio Filed Jan. 29, 1962, Ser. No. 169,386
7 Claims. (Cl. 307—88.5)

This invention relates to computer registers in general and more particularly to a register of the shifting or circulating type employing transistor-capacitor circuitry.

Many types of devices for use as a circulating or shift register have been devised in the past. For instance, registers utilizing a magnetic drum or disc surface to effect a certain delay have been used. In this type of device, information is written on the magnetic surface of the disc or drum and read therefrom at a predetermined time. Assuming, as is the usual case, that a one bit delay is encountered in the write amplifier and a one bit delay encountered in the read amplifier, all but two bits of the information which is being shifted or circulated is stored on the magnetic surface during circulation. It is therefore prohibitively expensive to read from such a register in parallel. Instead, the contents of the register or resolver must be serially read from the read amplifier.

In this type of register, it is necessary to use high gain voltage amplifiers for reading and power amplifiers for writing to compensate for the high attenuation of the stored information which results from the low efficiency of saturation recording and the relatively small signal obtained during reading. Signal-to-noise problems are also acute due to this attenuation of the stored information since in most computers there is a relatively large noise level caused by high current pulses throughout the computer.

Another problem encountered in the use of such a register is that signal information must generally be changed from the computer logical levels employed to levels required for the delay device used. Moreover, in the usual instance, a precise physical adjustment of the mganetic transducers is required and, therefore, elaborate means must be provided for maintaining physical tolerances during temperature and/or humidity variations.

Another register which is presetnly used is the magnetic core type which employs magnetic cores for information storage. The cores are driven to saturation in one direction or the other in accordance with whether or not a ONE or a ZERO is held. When a core is to be interrogated, a pulse is applied in a direction such as to drive it to a certain state of saturation. During the time that the interrogation pulse is being applied, a sensing is made of the core to determine whether or not it changes from one state of saturation to the other. The previous state of the core is thus determined. Special power amplifiers are necessary to drive the cores and special voltage and power amplifiers are required to read from them. As is obvious, while such a register is capable of parallel output, it is, like the register using a magnetic medium for delay, not capable of circulation without amplification. Again, in this type of register signal, attenuation and signal-to-noise problems are attendant, due to the relatively low signal generally obtained from the sense windings of the cores, and the relatively high noise level in most digital computers.

The flip-flop register, another register which is widely used at present, utilizes a series of flip-flops to store and shift or circulate information. A number of flip-flops, which may be of the Eccles-Jordan type, are serially connected with the output of one being fed to the input of the next. The advantages of flip-flop registers over those registers employing a magnetic medium to effect a delay are numerous. Included advantages are the ability to parallel output, low signal attenuation, good fidelity, operation at the logical levels of the computer, good signal-to-noise ratios, circulation without amplification, and relative stability over normal temperature and humidity fluctuations. With the exception of parallel outputting and relative stability during normal temperature variations, these advantages are equally applicable to magnetic core type registers.

Flip-flop registers do, however, have several shortcomings such as a susceptibility to both noise on the input lines as well as spiked noise on the supply lines. To make reasonably certain that the flip-flops are switched only by intended inputs, certain modifications are usually made to the standard two transistor Eccles-Jordan flip-flop. Among these changes is the addition of two transistors and associated circuitry to provide a clocked input. The transistors act as a gate and allow an input to the register only during the clock period. Addition of two transistors and associated components, of course, results in higher costs. Another shortcoming of flip-flop shift registers is that the alpha-cutoff and switching time requirements of the transistors used are relatively severe which necessitates the use of higher cost transistors which in turn result in higher per bit costs. In addition, the matching of components in flip-flop shift registers is quite important since component mismatch inherently results in deterioration of performance due to the inherent symmetrical characteristics of a flip-flop.

Another type of register recently developed does away with all of the undesirable characteristics heretofore mentioned. However, this type of register is often undesirable for use in many computers due to the fact that four clocks are required for its operation. Thus, since as in the usual computer, four clocks of specific timing duration and amplification are not available, utilization of this type of register requires modification to the computer timing which often is rather expensive. Several other shortcomings are also encountered through utilization of this four-clock shift register. For instance, the output of this circuit is Manchester and therefore delay problems arise upon reamplification of the term. Additionally, the output impedance of the register had to be kept high and therefore the output of the register had to be amplified before a computer gate could be driven. Moreover, normally the clock amplitude and clock width requirements were greater than for other associated computer circuits.

Ideally then a circulating register should have all of the attributes of a flip-flop shift register, i.e., parallel output ability, low signal attenuation, good fidelity, operation at the logical levels of the computer, good signal-to-noise characteristics, circulation without amplification and relative stability over normal temperature and/or humidity variations. In addition, over and above flip-flop shift registers, it should be relatively immune from noise on the input lines, be relatively immune from spiked noise on the supply lines, use inexpensive transistors in which the alpha-cutoff and switching time requirements are relatively unsevere, use low cost diodes in which the back resistance and recovery time requirements are relatively unsevere, operate satisfactorily despite relatively large clock width and supply voltage variations, and use other low tolerance components with little or no resultant deterioration in performance. Finally, the register should be operable on clocks which are normally available in the computer.

It is, therefore, an object of the present invention to provide a circulating register for use in a digital computer, the output of which may be taken serially or in parallel.

It is another object of the present invention to provide a circulating register which is capable of operation at the logical levels of the machine in which it is used.

It is another object of the present invention to provide a circulating register in which the signal information is circulated with very little resultant attenuation and loss in fidelity.

It is another object of the present invention to provide a circulating register having extremely good signal-to-noise characteristics.

It is another object of the present invention to provide a circulating register which is relatively stable over normal temperature and/or humidity variations.

It is another object of the present invention to provide a device which is relatively inexpensive in that relatively few components are required.

It is another object of the present invention to provide a circulating register which has good noise immunity properties and which is not sensitive to spiked noise on supply lines.

It is another object of the present invention to provide a circulating register wherein no amplification is required to maintain information circulation.

It is another object of the present invention to provide a circulating register which is capable of operating satisfactorily despite relatively large clock width and supply voltage variations.

It is another object of the present invention to provide a circulating register which is capable of operating satisfactorily on two computer clocks which are the reciprocal of each other.

Other and further objects and advantages of the herein-described invention will become apparent to those skilled in the art, when considered in the light of the accompanying drawings in which.

Briefly, the present invention is a circulating or shift register which is made up of a plurality of identical stages. The output from each stage may be fed into its own input to the input of the next stage, to the input of any other stages, or to an external device. Each stage comprises an input conversion-memory section and an amplification-delay section. The input-memory section comprises a voltage divider and capacitor circuit which converts the input term from a logical level to a positive or negative clock pulse which is applied as the input to the amplification-delay section which comprises a conventional two capacitor amplifier delay circuit.

Figure 1:
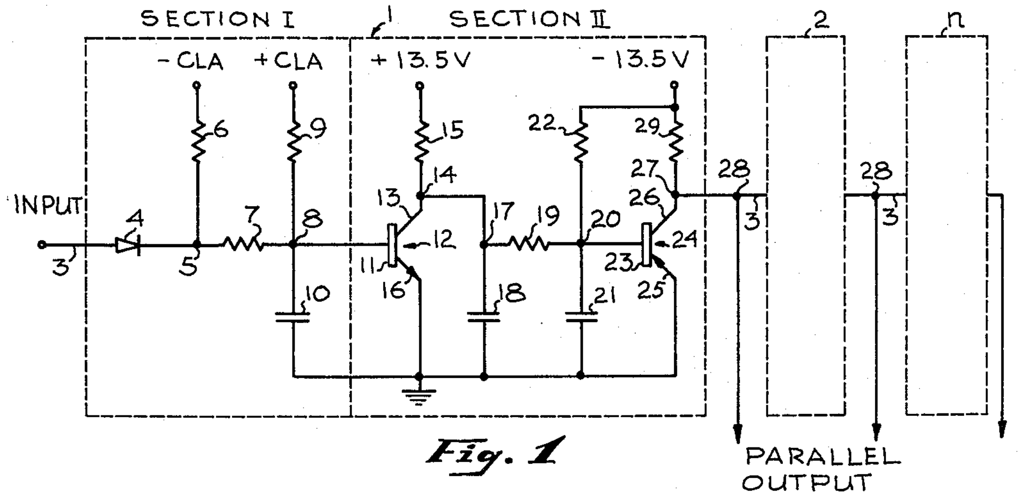
FIG. 1 is a schematic of the circulating register of the present invention.

Refer first to FIG. 1 wherein is shown a schematic diagram of the present invention. While a circuit description of only one stage will herein be given, as is apparent from a consideration of FIG. 1, a register of any desired length can be made simply by serially adding additional stages of the type hereinafter described. As is further obvious from a consideration of FIG. 1, the contents of the register may be taken in parallel from each stage 1, 2 . . . *n* or may be taken serially from any stage or bit position to accomplish a shift. Each stage of the present invention is identical. The input to the register as shown in FIG. 1 is along line 3 to the anode of diode 4. The cathode of diode 4 is connected to junction 5 which in turn is connected to one side of a resistor 6, the other side of which is connected to minus clock A (−CLA). Junction 5 is also connected to one side of a resistor 7, the other side of which is connected to junction 8. Junction 8 is also connected to one side of a resistor 9, the other side of which is connected to positive clock A (+CLA). Junction 8 is also connected to the nongrounded side of capacitor 10 and is also connected to the base 11 of transistor 12. The collector 13 of transistor 12 is connected to junction 14 which in turn is connected to one side of resistor 15. The other side of resistor 15 is connected to a positive potential which, for instance, may be +13.5 v. The emitter 16 of transistor 12 is grounded.

Junction 14 is in turn connected to junction 17 which in turn is connected to the nongrounded side of capacitor 18 and one side of resistor 19. The other side of resistor 19 is connected to junction 20 which is connected to the nongrounded side of capacitor 21. Junction 20 is also connected to one side of resistor 22, the other side of which is connected to a negative potential which may, for instance, be −13.5 v. Junction 20 is also connected to the base 23 on a PNP type transistor 24 which has its emitter 25 grounded. The collector 26 of transistor 24 is connected to the output junction 27 which is connected to the output terminal 28 and one side of a resistor 29. The other side of the resistor 29 is connected to the negative potential which may, for instance, be −13.5 v.

While in the following description certain voltage levels will be assumed, it is, of course, obvious that the voltage levels and the illustrative logical levels employed for purposes of description are not mandatory and any modifications therefrom may be made by one skilled in the art without departing from the present invention. Thus, for instance, from a consideration of FIG. 2, it can be seen that −CLA falls from +1.5 v. to −17 v., while at the same time, +CLA falls from −1.5 v. to +17 v. The pulse width of −CLA and +CLA is equal and the fall time of both pulses is equal.

For the purposes of explanation, assume that two logical levels, as follows, are used in the computer wherein the subject register is employed: 0 volts for false and −13.5 volts for true.

Figure 2:
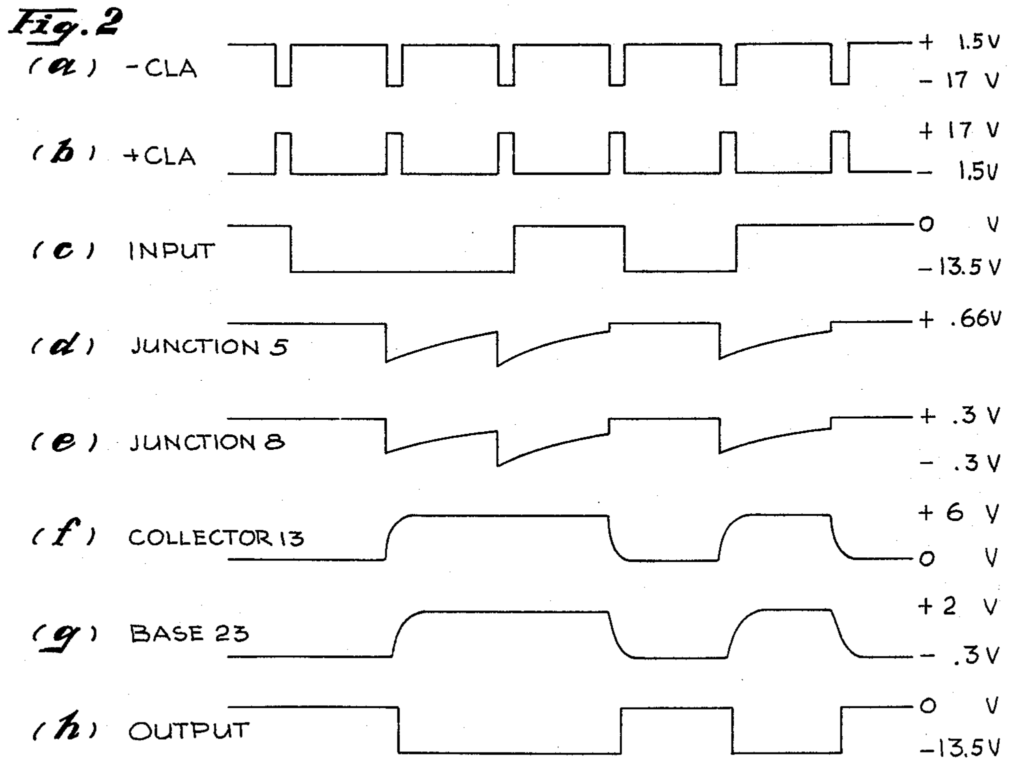
FIG. 2 is a chart showing the typical clocks utilized for operation of the present invention as well as voltage levels appearing at certain points in the schematic of FIG. 1.

In operation, the input, which may be either from the output of the last stage of the circulating register or may be from some other point in the computer or peripheral equipment as applied to the input line 3. Assume, as is shown in FIG. 2(*c*), that the input to the register is initially false (0 volts). In this case, since there is a zero potential on line 3 and the anode of diode 4, diode 4 will conduct at clock A time since at clock A the diode 4 is forward biased by −CLA. Thus, due to the forward biasing of diode 4, junction 5 is clamped near ground. There is also current flow from the +CLA source through the forward biased base emitter junction of transistor 12 to ground. The voltage drop across this forward biased base emitter junction is approximately .3 v. and therefore, as shown in FIG. 2(*e*), is clamped slightly positive to +.3v.

If the input is true (−13.5 v.), diode 4 is initially back biased which allows both −CLA and +CLA to appear across the resistor network 6, 7 and 9. The resistance values of resistors 6, 7 and 9 are chosen such that the divider action of this network favors −CLA such that the potential at junction 8 goes negative and transistor 12 is cut OFF at CLA time. Resistance values of 1.8K for resistor 6, 1K for resistor 7 and 5.6K for resistor 9 have proved satisfactory for this voltage dividing function. The memory capacitor 10 is charged negative at this time and holds this negative charge until the next CLA time.

The function of section 2 is to amplify and delay the signal apearing at the base 11 of transistor 12. Refer specifically to FIG. 2(*e*). The signal at junction 8 is of a magnitude such that transistor 12 is driven as a typical amplifier. When the transistor is turned OFF, current flows from the positive 13.5 v. source through dropping resistor 15, resistor 19 and resistor 22 to the negative 13.5 v. source. The voltage drop across resistor 15 establishes a +6.0 v. potential on the collector 13 of transistor 12. When the transistor is turned ON, current flows from the positive 13.5 v. source through resistor 15, collector 13, base 11 and emitter 16 to ground. Thus, when the transistor is turned ON, the collector 13 of transistor 12 is, neglecting any voltage drops across the transistor junctions, at substantially ground potential. The resistor network comprised of resistors 19 and 22 shifts the voltage levels appearing on the collector 13 more negative in order to drive transistor 24.

Refer next to FIG. 2(*g*). The value of resistor 22 is chosen such that the output capability of transistor 24 is, for instance, 15 milliamps. The values of resistor 15 and resistor 19 were chosen to obtain the proper voltage level shift. The positive charge across capacitor 18, which is charged up each time the transistor 12 is turned OFF, delays the upward swing of collecter 13 which in turn delays the turnoff time of transistor 24. The charge across capacitor 21 delays the negative voltage swing at the base 23 of transistor 24. Thus the turn on time of transistor 24 is delayed. It was found that these delays are necessary to assure that transistor 24 is not switched until after CLA has returned to 0 v.

Thus, as is obvious from a consideration of FIG. 2, a true input (−13.5 v.) on line 3 back biases diode 4 and thereby causes junction 8 and base 11 of transistor 12 to fall from +.3 v. to −.3 v., thereby turning transistor 12 OFF. At this time the collector 13 of transistor 12 rises to +6 v. This positive signal appears as +2 v. at the base 23 of transistor 24 to thereby turn transistor 24 OFF. When transistor 24 is turned OFF, the collector 26 falls to −13.5 v. which also appears at junction 28, which is the output of the shift register stage. Thus the output terminal 28 is at −13.5 v., which is indicative of the true input along line 3 to the stage.

From a consideration of the above description, it can be seen that the alpha-cutoff and switching time requirements of transistors 12 and 24 are quite unsevere since the transistors are not required to "switch" during the clock pulse as compared to a flip-flop. Instead, the switching action is intentionally delayed by capacitors 18 and 21. Thus the allowable alpha-cutoff and switching margins are quite large.

Another advantage of the subject shift register over flip-flop registers is its high degree of immunity from spiked noise on supply lines and noise appearing at the input of the register stage which results from clocking the input through means of CLA.

In the above described manner, we have provided a device which is capable of parallel output and which is capable of information circulation without amplification. No substantial attenuation in the delaying process is encountered in the use of the present device and no problems of voltage and power amplificaiton are encountered. The device is further capable of operating at the logical levels of most computers and is particularly immune from both spiked noise on supply lines as well as random noise within the machine itself. The device uses relatively few components per bit of storage. The transistors used need not be expensive in that the alpha-cutoff and switching time requirements are not severe. Likewise, inexpensive diodes may be used since the back resistance and recovery times are not critical. The other components in the register may likewise be inexpensive since no symmetrical flip-flop arrangement is used and therefore component mismatch will not result in deterioration in performance. Moreover, the margins of clock width, height and of supply voltage amplitude are greater for the present invention than for switching-type flip-flops. It is, of course, apparent that the above have been accomplished through utilization of only two clocks which are reciprocal of each other, which clock is, of course, readily available in any computer.

While there has been described what is at present considered to be a preferred embodiment of the invention, it will be obvious to those skilled in the art that various changes and modifications may be made therein without departing from the invention, and it is aimed in the appended claims to cover all such changes and modifications as fall within the true spirit and scope of the invention.

We claim:

1. In combination with a signal source capable of providing first and second input signals respectively having first and second voltage levels, a delay circuit for delaying said input signals comprising:
- a capacitor;
- current steering means including a diode having first and second terminals and a voltage divider network having first and second ends and first and second intermediate positions;
- means applying said input signals to said first terminal of said diode;
- means connecting said second terminal of said diode to said first intermediate position in said network;
- means connecting said capacitor between said second intermediate position in said network and a source of reference potential;
- and means respectively applying first and second simultaneous clock pulses of opposite polarity to said first and second ends of said network to respectively forward and back bias said diode when concurrent with said first and second input signals so as to respectively charge said capacitor in first and second directions.

2. In combination with a signal source capable of providing first and second input signals respectively having first and second voltage levels and a pair of clock sources capable of simultaneously respectively providing recurring clock signals of opposite polarity defining the duration of a clock period between adjacent clock signals, a delay circuit for delaying said input signals substantially one clock period comprising:
- a diode having first and second terminals;
- means applying said input signals to said first diode terminal;
- means applying said clock signals to said second diode terminals so as to forward bias said diode when the clock signals are concurrent with said first input signal and back bias said diode when the clock signals are concurrent with said second input signal;
- a capacitor having first and second terminals;
- and means respectively connecting said first and second capacitor terminals to said second diode terminal and a source of reference potential.

3. The combination of claim 2 wherein said means applying said clock signals to said second diode terminal includes first, second, and third resistors serially connected between said clock sources;
- said second diode terminal connected to the junction defined between said first and second resistors;
- said capacitor first terminal connected to the junction defined between said second and third resistors.

4. The combination of claim 2 including means for backbiasing said diode when said clock signals are not applied to said second diode terminal.

5. A shift register including a plurality of stages comprising in each of said stages an input section and an amplifier section;
- said input section including means responsive to a bilevel voltage input signal for respectively developing positive and negative clock pulses, said means including a diode having first and second terminals, a capacitor, and a voltage divider network having first and second ends and first and second intermediate positions;
- means applying said bilevel signal to said first terminal of said diode;
- means connecting said second terminal of said diode to said first intermediate position in said network;
- means connecting said capacitor between said second intermediate position in said network and a source of reference potential;
- and means respectively applying first and second simultaneous clock pulses of opposite polarity to said first and second ends of said network to respectively forward and back bias said diode when concurrent with said first and second levels of said bilevel signal to respectively charge said capacitor in first and second directions for developing positive and negative clock pulses at said second intermediate position.

6. A shift register including a plurality of stages comprising in each of said stages an input section and an amplifier section;

said input section including a diode having first and second terminals;

a first resistor and a second resistor connected in series and defining a junction therebetween;

a third resistor and said second resistor connected in series and defining a junction therebetween;

means applying a bilevel input signal to said first diode terminal;

means connecting said second diode terminal to said junction defined between said first and second resistors;

means respectively applying first and second simultaneous clock pulses of opposite polarity to the free ends of said first and third resistors so as to forward bias said diode when concurrent with a first level of said bilevel signal and back bias said diode when concurrent with a second level of said bilevel signal;

a capacitor connected between said junction defined between said second and third resistors and a source of reference potential;

and means coupling said junction between said second and third resistors to said amplifier section.

7. The combination of claim 6 wherein said amplifier section includes means for developing first and second voltage level outputs, respectively equal in amplitude to the first and second levels of said bilevel signal in response to voltage excursions at said junction between said second and third resistors.

References Cited in the file of this patent

UNITED STATES PATENTS 2,988,701 Clapper ---------------- June 13, 1961

OTHER REFERENCES

"RC Coupled Tunnel Diode Shift Register," by A. J. Gruodis, published in IBM Tech. Disclosure Bulletin, vol. 2, No. 6, dated April 1960.